(12) United States Patent
Yopp

(10) Patent No.: US 9,150,224 B2
(45) Date of Patent: Oct. 6, 2015

(54) TRANSITIONING FROM AUTONOMOUS VEHICLE CONTROL TO TO DRIVER CONTROL TO RESPONDING TO DRIVER CONTROL

(71) Applicant: Ford Global Technologies, LLC, Dearborn, MI (US)

(72) Inventor: Wilford Trent Yopp, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/035,366

(22) Filed: Sep. 24, 2013

(65) Prior Publication Data

US 2015/0088358 A1  Mar. 26, 2015

(51) Int. Cl.
| | |
|---|---|
| *B62D 11/00* | (2006.01) |
| *B60Q 1/34* | (2006.01) |
| *B62D 5/06* | (2006.01) |
| *B60W 50/10* | (2012.01) |
| *B60W 10/04* | (2006.01) |
| *B60W 10/18* | (2012.01) |
| *B60W 10/20* | (2006.01) |
| *B60W 50/08* | (2012.01) |
| *B60W 50/14* | (2012.01) |

(52) U.S. Cl.
CPC .............. *B60W 50/10* (2013.01); *B60W 10/04* (2013.01); *B60W 10/18* (2013.01); *B60W 10/20* (2013.01); *B60W 50/087* (2013.01); *B60W 2050/146* (2013.01)

(58) Field of Classification Search
CPC ........... B60R 21/015–21/01552; B60W 50/10; B60W 10/04; B60W 10/18; B60W 10/20; B60W 2050/146
USPC ..................... 701/23, 45–47, 70, 79, 110, 41; 340/467, 669, 426.31, 426.32, 465
See application file for complete search history.

(56) References Cited

U.S. PATENT DOCUMENTS

| | | | |
|---|---|---|---|
| 7,424,414 | B2 | 9/2008 | Craft |
| 8,352,112 | B2 | 1/2013 | Mudalige |
| 8,359,149 | B2 | 1/2013 | Shin |
| 2010/0316255 | A1 | 12/2010 | Mathony et al. |
| 2012/0083960 | A1 | 4/2012 | Zhu et al. |
| 2014/0172290 | A1* | 6/2014 | Prokhorov et al. ........... 701/408 |
| 2014/0303827 | A1* | 10/2014 | Dolgov et al. .................. 701/23 |

OTHER PUBLICATIONS

Kuchinskas, "Crash Course: Training the Brain of a Driverless Car", Scientific American, Apr. 11, 2013, http://www.scientificamerican.com/article.cfm?id=autonomous-driverless-car-brain.
Szondy, "University of Oxford Develops Low-Cost Self-Driving Car System", Feb. 18, 2013, : http://www.gizmag.com/oxford-robot-car/26282/.

* cited by examiner

*Primary Examiner* — Muhammad Shafi
(74) *Attorney, Agent, or Firm* — Frank A. MacKenzie; Bejin Bieneman PLC

(57) ABSTRACT

Instructions are provided to at least one vehicle control for autonomous operation of a vehicle. A change in position is detected of at the least one vehicle control. A determination is made whether to modify operation of the vehicle at least in part according to the change in position of the at least one vehicle control. The autonomous operation of the vehicle is modified according to the change in position.

12 Claims, 3 Drawing Sheets

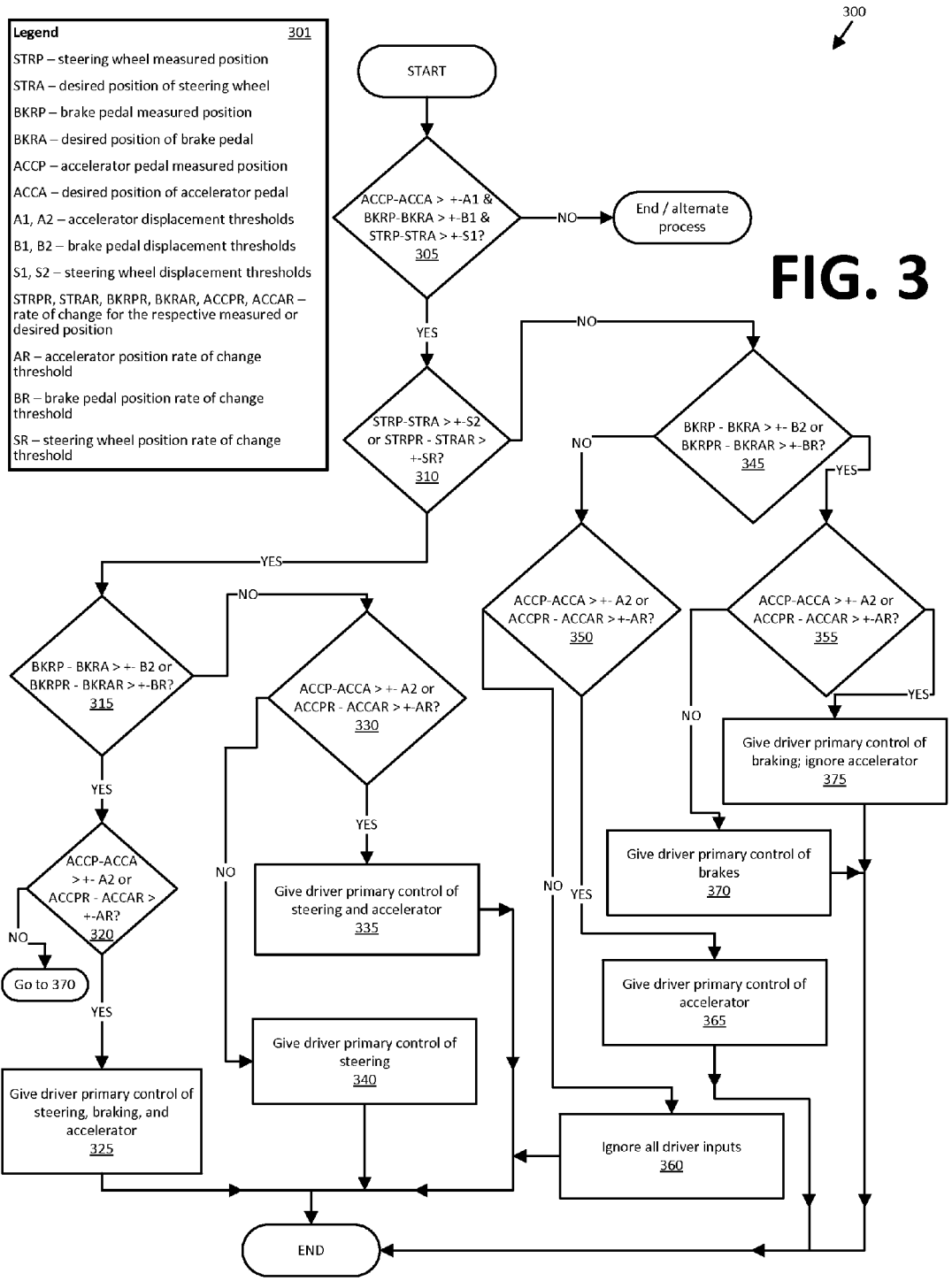

TRANSITIONING FROM AUTONOMOUS VEHICLE CONTROL TO TO DRIVER CONTROL TO RESPONDING TO DRIVER CONTROL

BACKGROUND

A vehicle such as an automobile may be configured for autonomous driving operations. For example, the vehicle may include a central control unit or the like, i.e., the computing device having a processor and a memory, that receives data from various vehicle data collection devices such as sensors and generally also external data sources such as navigation information. The central control unit may then provide instructions to various vehicle components, e.g., actuators and the like that control steering, braking, acceleration, etc., to control vehicle operations without action by a human operator. However, a human operator may remain "in the driver's seat," i.e., proximate to vehicle components such as a steering wheel, accelerator, brake pedal, gearshift lever, etc., and may have an ability to exercise control over such components.

DRAWINGS

FIG. 3 is a diagram of an exemplary process for addressing certain possible combinations of inputs to vehicle components including a steering wheel, a brake pedal, and an accelerator pedal during autonomous driving operations.

DETAILED DESCRIPTION

System Overview

Figure 1:
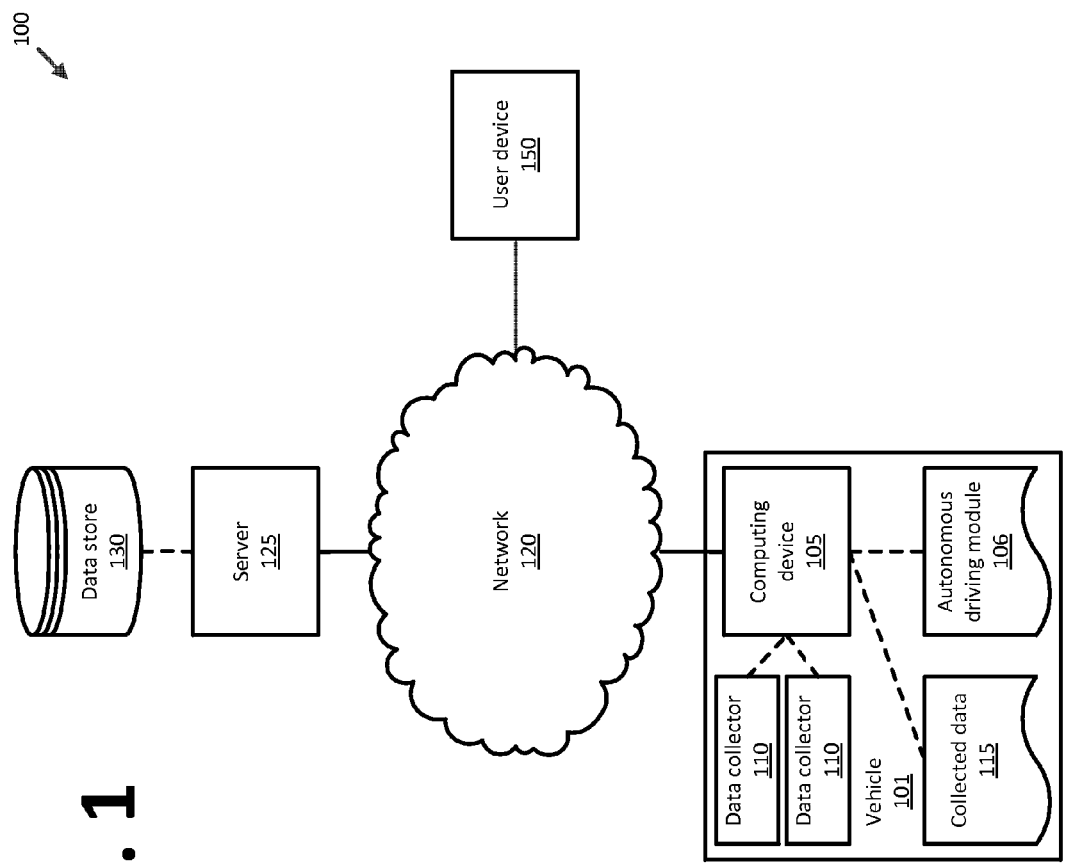
FIG. 1 is a block diagram of an exemplary autonomous vehicle system.

FIG. 1 is a block diagram of an exemplary autonomous vehicle system 100. A vehicle 101 includes a vehicle computer 105 that is configured to receive information, e.g., collected data 115, from one or more data collectors 110 related to various components of the vehicle 101. For example, collected data 115 may include data concerning position, change in position, rate of change of position, etc. of vehicle 101 components such as a steering wheel, brake pedal, accelerator pedal, gearshift lever, etc. The computer 105 generally includes an autonomous driving module 106 that comprises instructions for autonomously, i.e., without operator input, operating the vehicle 101, including possibly in response to instructions received from a server 125. Further, the computer 105, e.g., in the module 106, generally includes instructions for analyzing input of an operator (sometimes referred to as a "driver") to one or more vehicle components, such as a steering wheel, a brake pedal, and accelerator pedal, a gearshift lever, etc. For example, the computer 105 may determine whether the operator input was intentional or inadvertent, and/or whether autonomous vehicle 101 control should be modified or ignored in favor of the operator input.

The computer 105 may further be configured for communicating with one or more remote sites such as a server 125 via a network 120, such remote site possibly including a data store 130. Parameters for determining whether operator input to components of the vehicle 101 was intentional or inadvertent are generally stored in the computer 105. However, the module 106 may retrieve specific parameters from the data store 130, e.g., according to an identifier for a specific vehicle 101 operator, according to weather or other environmental conditions, according to an identifier for a particular vehicle 101, etc.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, operation of components such as lights, windshield wipers, etc.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. Yet other sensor data collectors 110 could include cameras, breathalyzers, motion detectors, etc., i.e., data collectors 110 to provide data for evaluating a condition or state of a vehicle 101 operator. In addition, data collectors 110 may include sensors to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. For example, collected data 115, as mentioned above, may include data concerning a position, change in position, rate of change in position, etc., of vehicle 101 components such as a steering wheel, brake pedal, accelerator, gearshift lever, etc.

The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, as well as parameters for evaluating operator input, e.g., parameters for a specific vehicle 101 operator, a specific vehicle 101, particular weather or other environmental conditions, etc. further, the server 125 may store information related to multiple vehicles 101, traffic conditions, weather conditions, etc., within a geographic area, with respect to a particular road, city, etc. The server 125 could also be configured to provide drive-by-wire instructions to vehicles 101 in an autonomous driving area, e.g., a road, etc., such as an "all stop" instruction for all vehicles 101 to stop, a speed restriction, a lane restriction, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 155 may use such communication capabilities to communicate via the network 120 and also directly with a vehicle computer 105, e.g., using Bluetooth.

Exemplary Process Flows

Figure 2:
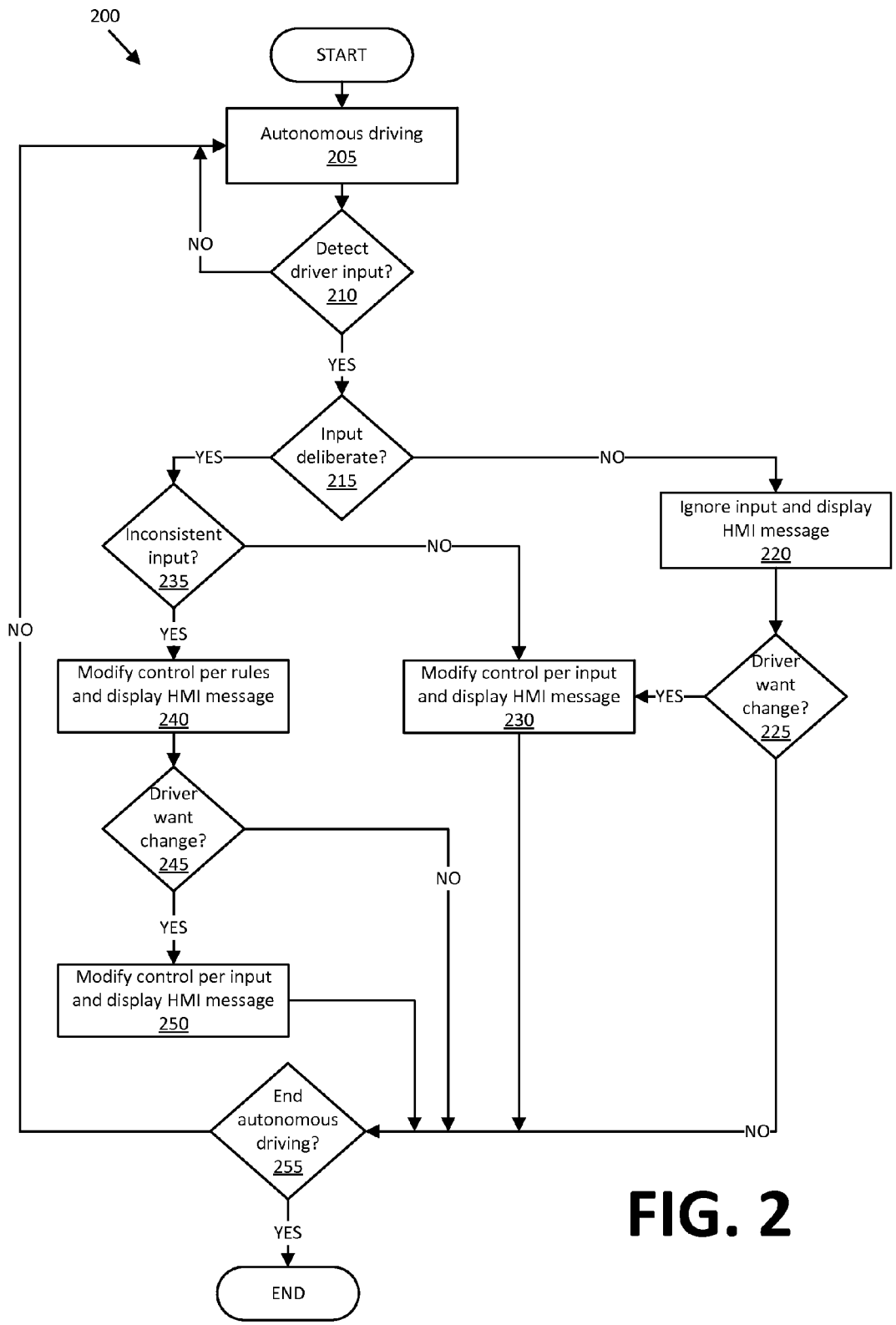
FIG. 2 is a diagram of an exemplary process for responding to operator input to one or more vehicle components during autonomous driving operations.

FIG. 2 is a diagram of an exemplary process for responding to operator input to one or more vehicle components during autonomous driving operations.

The process 200 begins in a block 205, in which a vehicle 101 commences autonomous driving operations, i.e., begins driving in a manner partially or completely controlled by the autonomous driving module 106. For example, all vehicle 101 operations, e.g., steering, braking, speed, etc., could be controlled by the module 106 in the computer 105. However, it is also possible that, in the block 205, the vehicle 101 may be operated in a partially autonomous (i.e., partially manual, fashion, where some operations, e.g., braking, could be manually controlled by a driver, while other operations, e.g., steering, could be controlled by the module 106.

Next, in a block 210, the computer 105, e.g., according to instructions in the module 106, determines whether driver input to a vehicle 101 component has been detected. For example, FIG. 3 illustrates an exemplary process 300 in which the computer 105 monitors a steering wheel, a brake pedal, and an accelerator pedal of a vehicle 101 for operator input. In any case, a data collector 110 may provide data to the computer 105 indicating that a vehicle 101 component has changed position due to operator input, i.e., not according to instructions provided by the module 106 for autonomous vehicle 101 operation. As mentioned above, the data collector 110 may provide other data to the computer 105 concerning operator input to a vehicle 101 component, such as an amount by which a component position has changed, a rate of change of component position, etc. If it is determined that driver input has been provided to a vehicle 101 component, then a block 215 is executed next. Otherwise, the process 200 returns to the block 205.

In the block 215, the computer 105 determines whether the operator input detected in the block 210 was deliberate. The process 300 discussed below with respect to FIG. 3 provides an example of determining whether one or more inputs were deliberate with respect to a steering wheel, a brake pedal, and an accelerator pedal of a vehicle 101. In general, for the component or components of the vehicle 101 for which input was detected, the computer 105 compares collected data 115 for such component or components to parameters included in the module 106. Alternatively or additionally, as mentioned above, such parameters may be stored in the data store 130, in which case the parameters may be downloaded to the computer 105 when autonomous driving operations commence in the block 205, when needed in the block 215, or at some other time.

In any event, as shown in the examples discussed with respect to FIG. 3, the computer 105 generally determines whether the detected operator input was deliberate according to whether collected data 115 related to the detected operator input triggers one or more thresholds provided in the parameters. For example, the computer 105 could determine, if operator movement of a steering wheel is detected, an amount by which the steering wheel was moved and/or a rate of change of position of the steering wheel according to collected data 115, and then could compare such metrics to provided parameters. If the steering wheel changed position less than an amount specified by a parameter and/or had been moved at a rate less than an amount specified by a parameter, then the computer 105 could determine that the operator input to the steering wheel was not deliberate.

As already mentioned, further examples are provided below with respect to FIG. 3, including examples in which operator input is detected with respect to more than one vehicle 101 component. With respect to cases in which operator input is detected with respect to multiple vehicle 101 components, the computer 105 generally further determines whether the respective inputs to the components were consistent. For example, rapidly turning a steering wheel and rapidly accelerating, or depressing a brake pedal and accelerator pedal simultaneously, could be determined to be inconsistent inputs, and therefore not deliberate. Further, as discussed below concerning FIG. 3, it is possible that inconsistent inputs could be received where one or more inputs are deemed deliberate where one or more inputs are deemed not to have been deliberate.

If operator input to one or more vehicle 101 components is determined to be deliberate in the block 215, then a block 235 is executed next. Otherwise, a block 220 is executed next.

In the block 220, the computer 105 ignores the driver input detected in the block 210, because such input has been determined not to be deliberate. Further, the computer 105 generally provides a message to a vehicle 101 operator via a human machine interface (HMI) in the vehicle 101, e.g., a graphical user interface (GUI) on a touchscreen or the like in the dash of the vehicle 101, an interactive voice response (IVR) system in the vehicle 101, etc. This message may ask the operator for input considering whether the operator wishes vehicle 101 operations to be conducted according to the input (or inputs) detected in the block 210.

The block 220 is followed by a block 225, in which the computer 105 determines whether an operator, e.g., driver, instruction has been received to conduct vehicle 101 operations according to the input detected in the block 210. If a negative indication is received, or if, after a predetermined period of time, no indication is received, then the process 200 proceeds to a block 255. However, if input is received indicating that the vehicle 101 operator does want the vehicle 101 to be controlled according to input received in the block 210, e.g., if a response is received to the HMI message, e.g., within a predetermined period of time such as five seconds, that the driver's inputs were intentional, then a block 230 is executed next.

In the block 230, vehicle 101 operation or control is modified according to the driver input received in the block 210. For example, a steering, braking, acceleration, etc. instruction or instructions may be implemented to control the vehicle 101. Further in the block 230, the computer 105 may display an HMI message requesting driver input concerning whether autonomous driving operations should be continued. The process 200 then proceeds to the block 255.

In a block 235, which follows the block 215 when at least one operator input in the block 210 was determined to be deliberate, the computer 105 determines whether inconsistent inputs were received. If only one input was received, or inputs were not inconsistent, i.e., consistent, then the process 200 proceeds to the block 230. However, as noted below with respect to examples provided in FIG. 3, the computer 105 could determine that, where multiple operator inputs were received in the block 210, one or more inputs were deliberate, and one or more inputs were not deliberate. However, if inconsistent inputs were received, then a block 240 is executed next.

In the block 240, the computer 105 instructs the module 106 to modify vehicle 101 operation or control according to one or more rules governing interpretation of inconsistent operator inputs. Although inconsistent inputs were received, it is nonetheless possible that one or more of the two or more inconsistent inputs should be followed. That is, the computer 105 and the module 106 may modify control of one or more vehicle 101 components according to a predetermined rule related to the components for which the inconsistent inputs were received.

For example, a rule could pertain to inputs received to a brake pedal and accelerator, a steering wheel and accelerator, etc. Examples of such rules are provided below with respect to FIG. 3, but in general the computer 105 evaluates the inconsistent inputs to determine which is most appropriate for vehicle control. For example, if a rate of change of brake pedal position exceeds a threshold parameter, but a rate of change of an accelerator pedal position falls below a second threshold parameter, then the module 106 may determine to allow vehicle 101 control according to the operator input received at the brake pedal.

Further, depending on the inconsistent inputs received, e.g., if a brake pedal and an accelerator pedal were depressed simultaneously, the module 106 could cause the vehicle 101 to take certain action based on the specific components with respect to which input was received. For example, in the case of a brake pedal and accelerator pedal being depressed simultaneously, the module 106 could cause the vehicle 101 to slow to below a predetermined rate of speed. Further for example, where there is a slight turn to a steering wheel, and a heavy application of a brake pedal, the computer 105 could determine to ignore the change in position of the steering wheel, but to implement braking according to the input to, and the change in position of, the brake pedal.

Also in the block 240, with respect to any operator input received in the block 210 that the computer 105 has determined to ignore, an HMI message may be displayed asking for a vehicle 101 operator response concerning whether the input should in fact be ignored. For example, an HMI message in the block 230 could obtain information, such as a specification of an input to be followed and input to be ignored, e.g., "execute brake operations and ignore input to the accelerator." The HMI message may also request operator input concerning whether autonomous vehicle 101 operations should continue.

Following the block 240, in a block 245, the computer 105 determines whether an operator, e.g., driver, instruction has been received to conduct vehicle 101 operations according to the input detected in the block 210 but ignored in the block 240. If a negative indication is received, or if, after a predetermined period of time, no indication is received, then the process 200 proceeds to the block 255. However, if input is received indicating that the vehicle 101 operator does want the vehicle 101 to be controlled according to the ignored input or inputs, then a block 250 is executed next.

In the block 250, vehicle 101 operation or control is modified according to the driver input or inputs that were ignored in the block 240. For example, a steering, braking, acceleration, etc. instruction or instructions may be implemented to control the vehicle 101. Further in the block 250, the computer 105 may display an HMI message requesting driver input concerning whether autonomous driving operations should be continued. The process 200 then proceeds to a block 255.

In the block 255, the computer 105 determines whether to continue autonomous driving operations. For example, a driver instruction to cease autonomous driving operations could be indicated in response to an HMI message displayed as described above. Further, an operator input received in the block 210 could be a basis for determining to cease autonomous driving operations. For example, the computer 105 could be programmed to determine that a severe braking operation, or hard turn, etc., should be a basis for ceasing autonomous driving operations. In any event, if it is determined to end autonomous driving operations, the process 255 ends. Otherwise, the process 200 returns to the block 205.

FIG. 3 is a diagram of an exemplary process for addressing certain possible combinations of inputs to vehicle components including a steering wheel, a brake pedal, and an accelerator pedal during autonomous driving operations.

The following is a list of abbreviations used in FIG. 3, for convenience reproduced as a legend 301 on FIG. 3:

STRP—steering wheel measured position;
STRA—desired position of steering wheel;
BKRP—brake pedal measured position;
BKRA—desired position of brake pedal;
ACCP—accelerator pedal measured position;
ACCA—desired position of accelerator pedal;
A1, A2—accelerator displacement thresholds;
B1, B2—brake pedal displacement thresholds;
S1, S2—steering wheel displacement thresholds;
STRPR, STRAR, BKRPR, BKRAR, ACCPR, ACCAR—rate of change for the respective measured or desired position;
AR—accelerator position rate of change threshold;
BR—brake pedal position rate of change threshold;
SR—steering wheel position rate of change threshold.

The above metrics may be measured in a variety of ways. For example, steering wheel position and displacements may be measured by an angular displacement sensor from a predefined point on the steering wheel, and a rate of change of a steering wheel position may be a calculated rate of change in angular displacement. Metrics related to an accelerator pedal and a brake pedal may be similarly measured by a linear displacement sensor, and respective rates of change can also be calculated.

A "measured position" is a position of a component as detected by a data collector 110 and communicated to the computer 105, e.g., the position of the component after an operator has provided input such as turning a steering wheel, depressing a brake pedal, or depressing the accelerator pedal. A "desired position" is a position of a component to be desired according to autonomous driving instructions provided by the module 106, e.g., an appropriate position of a steering wheel, brake pedal, or accelerator pedal based on instruction of the module 106. For example, a desired position of a steering wheel would be the position of the steering wheel appropriate for steering being executed by the module 106, whereas the measured position of the steering wheel could be the same as the desired position of the steering wheel, but could be different if the steering wheel had been moved according to operator input, i.e., the operator turning the steering wheel at a different rate and/or to a different position than directed by the module 106.

The process 300 begins in a block 305, in which the module 106, responding to operator input to at least one of a steering wheel, brake pedal, or accelerator pedal, e.g., as described above with respect to the block 210, determines whether the difference between each of a desired and measured steering wheel position, a desired and measured brake pedal position, and/or a desired and measured accelerator pedal position exceed respective predetermined thresholds. For example, thresholds may be determined by testing and may provide a general case for expected positions of components, but can be adjusted for different driving modes, e.g., low speed, high speed, hazardous road conditions, driver preferences, driver experience levels, etc.

If each of the three respective predetermined thresholds A1, B1, and S1 are exceeded, then the process 300 proceeds to a block 310. If none of the thresholds are exceeded, then the process 300 will end. However, if one or two of the three thresholds are exceeded, then the module 106 may end the process 300 but invoke an alternate process that, as will be understood, operates in a manner similar to the process 300 to consider scenarios specific to the particular threshold or thresholds exceeded.

For example, if a threshold S1 has been exceeded with respect to a steering wheel position, an alternate process may be executed that considers only the difference between the desired and measured steering wheel position and or the difference between a desired and a measured rate of change of the steering wheel position. To continue this example, the module 106 could ignore the driver input to the steering wheel as described below with respect to a block 360, or could determine to steer the vehicle 101 in a manner consistent with operator input, in a manner similar to that described below with respect to a block 340.

Further, in an example where thresholds are exceeded for two components, e.g., a steering wheel and an accelerator, an alternate process could be executed that considers differences of desired and measured positions and rates of change of positions of the steering wheel and accelerator. Based on such consideration, the module 106 could ignore the driver inputs to each of the steering wheel and accelerator as described below with respect to the block 360, could ignore input to the accelerator but give the driver control of steering as described below with respect to the block 340, or could ignore input to the steering wheel, and could give the driver control of accelerator as described below with respect to a block 365.

Continuing with the process 300, in a block 310, which may follow the block 305, the module 106 determines whether the steering wheel displacement exceeds a second predetermined threshold S2, or whether a difference between measured and desired rates of change of steering wheel position exceed a steering wheel position rate of change threshold SR. If either of these considerations evaluates to yes, then a block 315 is executed next. Otherwise, the process 300 proceeds to a block 345.

The second threshold S2 is generally greater than the first predetermined threshold S1 referenced above with respect to the block 305. The threshold S1 may be used to make a first determination a first movement of a steering wheel exceeded a first predetermined distance; however, if the steering wheel movement reflects a change in position that is below a second limit that is larger than the predetermined distance, then this movement may have been inadvertent and an HMI message may be preferable to determine driver intent. However, if the distance a steering wheel moved exceeded the second threshold S2, then the steering wheel movement may be clearly regarded as an intentional driver action.

In the block 315, the module 106 evaluates whether brake pedal displacement exceeds a second predetermined threshold B2, or whether a difference between measured and desired rates of change of brake pedal position exceed a brake pedal position rate of change threshold BR. If either of these considerations evaluates to yes, then a block 320 is executed next. Otherwise, the process 300 proceeds to a block 330.

In the block 320, the computer 105 evaluates whether an accelerator pedal displacement exceeds a second predetermined threshold A2, or whether a difference between measured and desired rates of change of accelerator pedal position exceed an accelerator pedal position rate of change threshold AR. If either of these considerations evaluates to yes, then a block 325 is executed next. Otherwise, the process 300 proceeds to a block 370.

In the block 325, the module 106 adjusts control of the vehicle 101 and/or displays an HMI message as discussed above, e.g., with respect to the block 220. In the case of the block 325, the module 106 gives the vehicle 101 operator primary control of each of steering, braking, and acceleration based on predetermine rules. For examine, one or more rules could specify to give the driver control of only the steering and braking functions and to ignore acceleration, because depressing both the brake and accelerator at the same time is unlikely to be the intent of the driver. In either case, actions are based on such predetermined rules stored in the computer 105. For this example instructions in the computer 105 could be based on the assumption that the autonomous vehicle 101 operations cease with respect to each of steering, braking, and acceleration functions when an accelerator and brake pedal are depressed at the same time, and the vehicle 101 is then operated according to driver input. Following the block 325, the process 300 ends.

The block 330 may follow the block 315, and includes the same evaluations discussed with respect to the block 320. If either of these evaluations in the block 330 is affirmative, then a block 335 is executed next. Otherwise, a block 340 is executed next.

In the block 335, the module 106 adjusts control of the vehicle 101 and/or displays an HMI message as discussed above, e.g., with respect to the block 220. In the case of the block of 335, the module 106 gives the vehicle 101 operator primary control of each of steering and acceleration. Following the block 335, the process 300 ends.

In the block 340, the module 106 adjusts control of the vehicle 101 and/or displays an HMI message as discussed above, e.g., with respect to the block 220. In the case of the block of 335, the module 106 gives the vehicle 101 operator primary control of steering. Following the block 340, the process 300 ends.

In the block 345, as in the block 315, the module 106 evaluates whether brake pedal displacement exceeds a second predetermined threshold B2, or whether a difference between measured and desired rates of change of brake pedal position exceed a brake pedal position rate of change threshold BR. If either of these considerations evaluates to yes, then a block 355 is executed next. Otherwise, a block 350 is executed next.

Each of the blocks 350, 355, includes the same evaluations discussed with respect to the block 320. If either of these evaluations in the block 350 is in the affirmative, then a block 365 is executed next; otherwise, a block 360 follows the block 350. If either of these evaluations is affirmative in the block 355, then a block 375 is executed next; otherwise, a block 370 follows the block 355.

In the block 360, which may follow the block 350, the module 106 determines to ignore all driver inputs, and the process 300 ends.

In the block 365, which may follow the block 350, the module 106 adjusts control of the vehicle 101 and/or displays an HMI message as discussed above, e.g., with respect to the block 220. In the case of the block 365, the module 106 gives the vehicle 101 operator primary control of acceleration. Following the block 365, the process 300 ends.

In the block 370, which may follow the block 355, the module 106 adjusts control of the vehicle 101 and/or displays an HMI message as discussed above, e.g., with respect to the block 220. In the case of the block of 370, the module 106 gives the vehicle 101 operator primary control of braking. Following the block 370, the process 300 ends.

In the block 375, which may follow the block 355, the module 106 adjusts control of the vehicle 101 and/or displays an HMI message as discussed above, e.g., with respect to the block 220. In the case of the block of 375, the module 106 gives the vehicle 101 operator primary control of braking and ignores acceleration, according to a set of predetermined rules, since pressing is not the likely intent. Following the block 375, the process 300 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
provide instructions to two vehicle controls for autonomous operation of the vehicle;
detect simultaneous respective changes in position of each of the vehicle controls;
determine that the respective changes in position represent inconsistent driver control inputs for operation of the vehicle;
select one of the vehicle controls, and determine to ignore the other of the vehicle controls, to provide input for vehicle control;

determine to modify operation of the vehicle at least in part according to the change in position of the selected vehicle control; and modify the autonomous operation of the vehicle according to the change in position of the selected control, wherein the modifying includes providing at least one instruction to modify at least one of vehicle braking, steering, or acceleration; the method further comprising implementing the instruction to control the vehicle.

2. The system of claim 1, wherein the selected vehicle control is at least one of a steering control, an accelerator, and a brake.

3. The system of claim 1, wherein modifying the operation of the vehicle includes ceasing autonomous operation of the vehicle.

4. The system of claim 1, wherein the computer is further configured to display a message to a user requesting input concerning whether an operation of the vehicle should be carried out according to the change in position of the selected control.

5. The system of claim 1, wherein:
the computer is further configured to determine a rate of the change of position of the selected vehicle control, and
determining to modify operation of the vehicle according to the change in position of the selected vehicle control includes determining whether to modify operation of the vehicle at least in part according to the rate of change in position of the selected vehicle control.

6. The system of claim 5, wherein the computer is further configured to determine whether to modify operation of the vehicle according to at least one of whether the change of position exceeds a first predetermined threshold and the rate of change of the position exceeds a second predetermined threshold.

7. A method, comprising: performing, by a computer processor:
providing instructions to two vehicle controls for autonomous operation of the vehicle;
detecting simultaneous respective changes in position of each of the vehicle controls;
determining that the respective changes in position represent inconsistent driver control inputs for operation of the vehicle;
selecting one of the vehicle controls, and determining to ignore the other of the vehicle controls, to provide input for vehicle control;
determining to modify operation of the vehicle at least in part according to the change in position of the selected vehicle control; and
modifying the autonomous operation of the vehicle according to the change in position of the selected control.

8. The method of claim 7, wherein the selected vehicle control is at least one of a steering control, an accelerator, and a brake.

9. The method of claim 7, wherein modifying the operation of the vehicle includes ceasing autonomous operation of the vehicle.

10. The method of claim 7, further comprising displaying a message to a user requesting input concerning whether an operation of the vehicle should be carried out according to the change in position of the selected control.

11. The method of claim 7, further comprising:
determining a rate of the change of position of the selected vehicle control, and
determining to modify operation of the vehicle according to the change in position of the selected vehicle control includes determining whether to modify operation of the vehicle at least in part according to the rate of change in position of the selected vehicle control.

12. The method of claim 11, further comprising determining whether to modify operation of the vehicle according to at least one of whether the change of position exceeds a first predetermined threshold and the rate of change of the position exceeds a second predetermined threshold.

* * * * *